(12) United States Patent
Wu

(10) Patent No.: US 8,948,002 B2
(45) Date of Patent: Feb. 3, 2015

(54) METHOD AND DEVICE FOR PREVENTING REPEATED REFRESHING OF ADDRESS TABLE OF ETHERNET RING NETWORK NODE

(75) Inventor: Shaoyong Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 45 days.

(21) Appl. No.: 13/576,656

(22) PCT Filed: Apr. 12, 2010

(86) PCT No.: PCT/CN2010/071700
§ 371 (c)(1),
(2), (4) Date: Aug. 9, 2012

(87) PCT Pub. No.: WO2011/094971
PCT Pub. Date: Aug. 11, 2011

(65) Prior Publication Data
US 2013/0028076 A1 Jan. 31, 2013

(30) Foreign Application Priority Data
Feb. 5, 2010 (CN) .......................... 2010 1 0107236

(51) Int. Cl.
H04L 1/00 (2006.01)
H04L 12/437 (2006.01)
H04L 12/40 (2006.01)

(52) U.S. Cl.
CPC ........ H04L 12/437 (2013.01); H04L 12/40013 (2013.01)
USPC ............................. 370/222; 370/258; 370/406

(58) Field of Classification Search
CPC . H04L 12/24; H04L 12/40013; H04L 12/437; H04L 41/0604; H04L 12/462; H04L 9/00; H04L 12/56; H04L 12/28; H04L 12/26; H04L 1/00; H04J 3/14; G08C 15/00; G06F 15/16; G06F 11/00; G01R 31/08
USPC ......... 370/255, 216–225, 228, 248–254, 258, 370/389, 401, 406; 709/224, 245–251; 380/256
See application file for complete search history.

(56) References Cited

U.S. PATENT DOCUMENTS 6,496,519 B1 12/2002 Russell
6,766,482 B1 7/2004 Yip
(Continued)

FOREIGN PATENT DOCUMENTS

CN 101127675 A * 2/2008
CN 101163079 A 4/2008
(Continued)

OTHER PUBLICATIONS

International Search Report in international application No. PCT/CN2010/071700, mailed on Nov. 11, 2010.
(Continued)

Primary Examiner — Bob Phunkulh
Assistant Examiner — Wali Butt
(74) Attorney, Agent, or Firm — Oppedahl Patent Law Firm LLC

(57) ABSTRACT

A method and a device for preventing repeated refreshing of an address table of an Ethernet ring network node are provided. After a state of a port of the Ethernet ring network node is changed to a blocked state, it is determined that whether the Ethernet ring network node is an RPL neighbor node and whether the blockage is triggered by an RPL Blocked protocol frame. If so, the Ethernet ring network node stores refreshed record information corresponding to its two ports on the ring. The problem that an RPL neighbor node refreshes an address table repeatedly in the scenario of switchback of an Ethernet ring network can be effectively solved via the aforementioned method and device, thereby reducing flow broadcast during protection switching of the Ethernet ring network and improving the switching efficiency.

14 Claims, 5 Drawing Sheets

(56) References Cited

U.S. PATENT DOCUMENTS

| | | | |
|---|---|---|---|
| 7,003,705 B1 | 2/2006 | Yip | |
| 8,255,575 B2* | 8/2012 | Sakurai | 709/251 |
| 8,320,236 B2* | 11/2012 | Wu et al. | 370/217 |
| 2004/0081083 A1 | 4/2004 | Sekihata | |
| 2005/0207348 A1 | 9/2005 | Tsurumi | |
| 2009/0147675 A1 | 6/2009 | Sekihata | |
| 2009/0316571 A1* | 12/2009 | Rose | 370/218 |
| 2010/0165883 A1* | 7/2010 | Holness et al. | 370/255 |
| 2010/0260040 A1* | 10/2010 | Wu | 370/223 |
| 2010/0290340 A1* | 11/2010 | Lee et al. | 370/225 |
| 2011/0040898 A1* | 2/2011 | Kim et al. | 709/251 |

FOREIGN PATENT DOCUMENTS

| | | | | |
|---|---|---|---|---|
| CN | 101217443 A | | 7/2008 | |
| CN | 101640622 A | * | 2/2010 | |
| EP | 1796318 A1 | * | 6/2007 | H04L 12/18 |
| JP | 2008136013 A | | 6/2008 | |
| WO | WO 2008154781 A1 | * | 12/2008 | |
| WO | WO 2009039698 A1 | * | 4/2009 | |
| WO | WO 2011026347 A1 | * | 3/2011 | |

OTHER PUBLICATIONS

English Translation of the Written Opinion of the International Search Authority in international application No. PCT/CN2010/071700, mailed on Nov. 11, 2010.

Supplementary European Search Report in European application number: 10845056.0, mailed on Nov. 26, 2014.

* cited by examiner

METHOD AND DEVICE FOR PREVENTING REPEATED REFRESHING OF ADDRESS TABLE OF ETHERNET RING NETWORK NODE

TECHNICAL FIELD

The present disclosure relates to an Ethernet technology, and more particularly, to a method and a device for preventing repeated refreshing of an address table of an Ethernet ring network node.

BACKGROUND

With the development of Ethernet towards a multi-service carrier, particularly the increasing requirements of some services on the reliability and real-time performance of a network, the Ethernet widely adopts the manner of ring networking to improve the reliability of the network. In addition, in a protection scheme for the ring networking, it is generally required that fast protection switching can be completed within 50 ms. Currently, the technology for fast protection switching can be implemented based on the G.8032v2 protocol of the International Telecommunication Union Telecommunication Standardization Sector (ITU-T).

Based on the G.8032v2 protocol, an automatic protection switching protocol and mechanism is defined for an Ethernet Layer of a ring topological Ethernet. Such a network protection method is applied to the ring topological Ethernet and includes the following major implementation processes: in the ring topological Ethernet, a link is selected as a Ring Protection Link (RPL) and two adjacent nodes on the RPL are configured to control blockage or connection of the RPL. One of the nodes is called an RPL owner node and the other one is called an RPL neighbor node. Adjacent ports relative to the RPL on the two adjacent nodes in the RPL are called RPL ports.

When all links of an Ethernet ring network are normal, the two adjacent nodes of the RPL block the RPL ports to prevent protected data from passing through the RPL. By doing so, there is only one communication path between any two nodes in the Ethernet ring network, thus avoiding a closed loop of the communication path in the Ethernet ring network and preventing the closed loop and a network storm. When a failure occurs in a link of the Ethernet ring network, a node adjacent to the failed link blocks a fault port if the failed link is not an RPL, and two nodes adjacent to the RPL make the two RPL ports connected to enable the protected data to pass through the RPL. Therefore, a new communication path is generated between any two nodes of the RPL to guarantee reconnection of the communication path and improve the network reliability.

During an Ethernet switching process, a communication path of data flow changes. Since address table information recorded by each node may not be applicable any longer after the communication path of the data flow changes, each node may need to refresh its address table, wherein the refresh refers to delete an address item of a port on the ring. In the G.8032v2 protocol, an Ethernet ring network protection protocol frame sent by a node includes a node numbering of the node itself and an index numbering of a blocked port. After receiving the protocol frame, other nodes extract the node numbering and the index numbering of the blocked port from the protocol frame, and compare the node numbering and the index numbering of the blocked port in the protocol frame with a node numbering and an index numbering of a blocked port in refreshed record information stored for a receiving port, and if they are different, update the refreshed record information corresponding to the receiving port as the extracted node numbering and index numbering of the blocked port. In addition, if the node numbering and the index numbering of the blocked port in the protocol frame are different from the node numbering and the index numbering of the blocked port in the refreshed record information corresponding to a port opposite to the receiving port, the node may also need to refresh its address table. Moreover, when the node is blocking a port, the node needs to delete node numbering and index numbering of the blocked port in refreshed record information corresponding respectively to two ports of the node on the ring.

Although the above scheme for refreshing the address table in the Ethernet ring network guarantees that an error address item can be rapidly deleted during switching of the Ethernet ring network, it causes the problem that the address table is refreshed repeatedly during the switching. For example, during a switchback process upon recovery of the link from failure, after blocking an RPL port, the RPL owner node sends a No Request RPL Blocked (NRRB) protocol frame. After the RPL Port receives the RPLB protocol frame, since a node numbering and an index numbering of a blocked port in the RPLB protocol frame are different from a node numbering and an index numbering of a blocked port in refreshed record information corresponding to a receiving port, the RPL Port updates the refreshed record information corresponding to a receiving port as the received node numbering and index numbering of the blocked port. In addition, since the node numbering and the index numbering of the blocked port in the received RPLB protocol frame are also different from a node numbering and an index numbering of a blocked port in refreshed record information corresponding to a port opposite to the receiving port, the RPL Port updates the address table according to an address refreshing principle of the Ethernet ring network.

Subsequently, RPL neighbor node further needs to block the RPL Port and delete the node numbering and index numbering of the blocked port in the refreshed record information corresponding respectively to two ports of the RPL neighbor node on the ring. Since the RPL owner node will send an RPL Blocked (RPLB) protocol frame continuously, the RPL neighbor node, after receiving a subsequent RPL blocked protocol frame, will refresh the address table over again because its two ports do not have refreshed record information. However, the address table refreshing operation is unnecessary actually and may possibly cause a burst of network traffic because there are too many involved nodes and users, which hampers effective utilization of network recourses and normal operation of user services.

SUMMARY

In view of this, the main purpose of the present disclosure is to provide a method and a device for preventing repeated refreshing of an address table of an Ethernet ring network node to solve the problem that an RPL neighbor node refreshes an address table repeatedly in the scenario of switchback of an Ethernet ring network.

To achieve the purpose above, the technical solution of the present disclosure is implemented as follows.

A method for preventing repeated refreshing of an address table of an Ethernet ring network node includes: after a state of a port of the Ethernet ring network node is changed to a blocked state, it is determined that whether the Ethernet ring network node is an RPL neighbor node and whether the blockage is triggered by an RPLB protocol frame; if so, the Ethernet ring network node saves refreshed record information corresponding to its two ports on the ring.

The process of determining whether the Ethernet ring network node is the RPL neighbor node may be realized via enquiring a node attribute of the Ethernet ring network node.

The process of determining whether the blockage is triggered by the RPLB protocol frame may be realized via parsing a content of a received data structure.

The method may further include: a subsequent operation is executed according to an existing technology if the Ethernet ring network node is determined not to be an RPL neighbor node.

The method may further include: a subsequent operation is executed according to an existing technology if the blockage is not triggered by the RPLB protocol frame.

The refreshed record information may include: a node numbering, and an index numbering of a blocked port.

A device for preventing repeated refreshing of an address table of an Ethernet ring network node includes a blockage triggering detection unit and a refreshed record information maintenance unit connected to each other, wherein after a state of a port of the Ethernet ring network node is changed to a blocked state, the blockage triggering detection unit is configured to determine whether the Ethernet ring network node to which the blockage triggering detection unit itself belongs is an RPL neighbor node and whether the blockage is triggered by an RPLB protocol frame, and send a determination result to the refreshed record information maintenance unit;

the refreshed record information maintenance unit is configured to save, when the Ethernet ring network node to which the blockage triggering detection unit itself belongs is the RPL neighbor node and the blockage is triggered by the RPLB protocol frame, refreshed record information corresponding to two ports of the Ethernet ring network node to which the refreshed record information maintenance unit itself belongs on the ring.

The blockage triggering detection unit may include a node determination unit and a blockage reason determination unit, wherein the node determination unit may be configured to determine whether the Ethernet ring network node to which the node determination unit itself belongs is an RPL neighbor node and generate a determination result which can be sent to the refreshed record information maintenance unit;

the blockage reason determination unit may be configured to determine whether the blockage operation is caused by a received RPLB protocol frame, and generate a determination result which can be sent to the refreshed record information maintenance unit.

The node determination unit and the blockage reason determination unit may be configured to notify the refreshed record information maintenance unit of their respective generated determination results, or a connection relationship may exist between the node determination unit and the blockage reason determination unit, and the node determination unit and the blockage reason determination unit may be configured such that one of the node determination unit and the blockage reason determination unit notifies its determination result to another one of the node determination unit and the blockage reason determination unit, to trigger the another one to make subsequent determination.

The refreshed record information may include: a node numbering, and an index numbering of a blocked port.

To sum up, the method and the device of the present disclosure can effectively solve the problem that an RPL neighbor node refreshes an address table repeatedly in the scenario of switchback of an Ethernet ring network, thereby reducing flow broadcast during protection switching of the Ethernet ring network and improving the switching efficiency.

DETAILED DESCRIPTION

Figure 1:
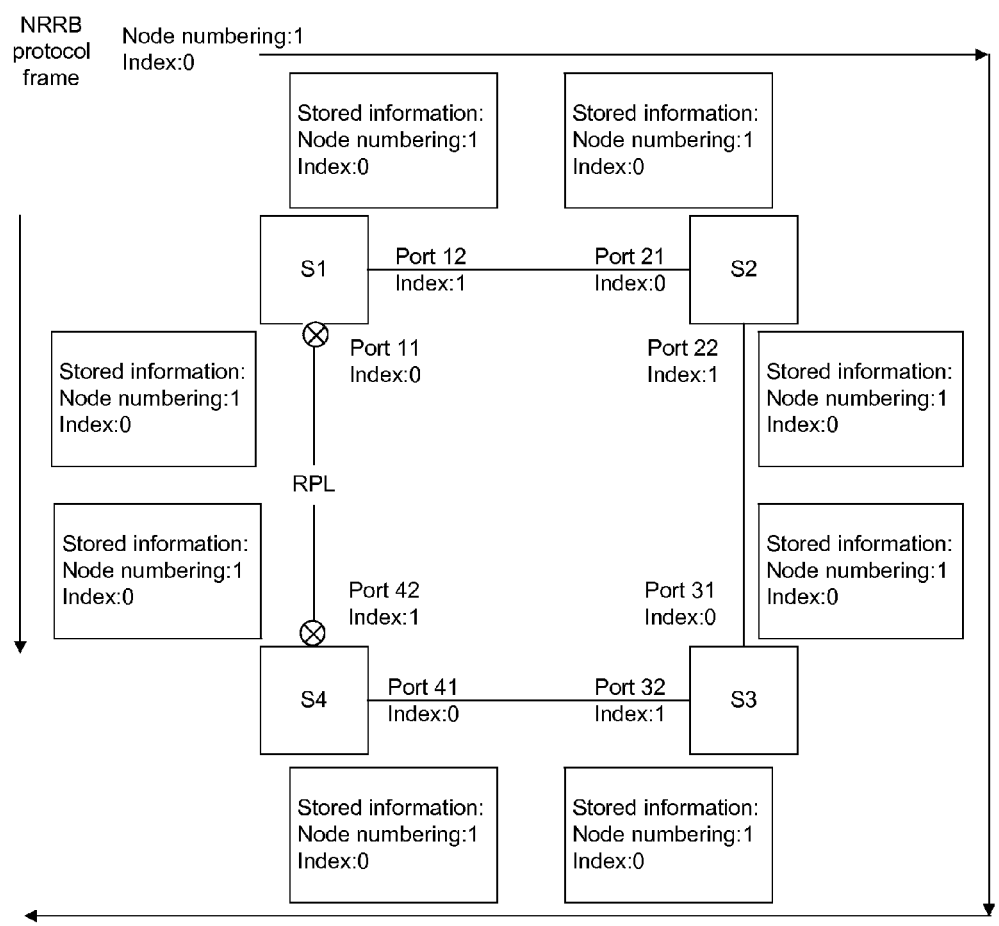
FIG. 1 is a schematic diagram illustrating an operation when a link of an Ethernet ring network is normal.

As shown in FIG. 1, FIG. 1 is a schematic diagram illustrating an operation when a link of an Ethernet ring network is normal. An Ethernet consists of nodes S1, S2, S3 and S4 in FIG. 1. A link between Node S1 and Node S4 is an RPL. Node S1 is an RPL owner node. Node S4 is an RPL neighbor node. Node S1 makes the RPL blocked or connected by controlling blockage and switch-on of Port 11. The port blockage herein means that a blocked port of a node fails to forward protected data, but is still able to receive or send an Ethernet ring network protection protocol frame of G.8032v2.

When the link of the Ethernet ring network as shown in FIG. 1 is normal, Node S1 blocks Port 11 to prevent the protected data from passing through the RPL, i.e. the protected data cannot be forwarded by Node S1. The communication path for the protected data flow between Node S2 and Node S3 is only S2←→S3, but not S2←→S1←→S4←→S3. Therefore, a closed loop of the communication path cannot be generated in the ring network and a network storm is prevented.

When the link of the Ethernet ring network is normal, an RPL owner node sends an RPL Blocked (RPLB) protocol frame periodically to notify other nodes that the RPL is in a blocked state. The RPLB protocol frame includes a node numbering of a sending node (a node who sends the RPLB protocol frame), and an index numbering of a blocked port. After receiving the RPLB protocol frame, other nodes extract the node numbering and the index numbering of the blocked port in the RPLB protocol frame, and compare the node numbering and the index numbering of the blocked port in the RPLB protocol frame with a node numbering and an index numbering of a blocked port in refreshed record information which is stored in the nodes themselves and corresponding to a receiving port, and if the node numbering and the index numbering of the blocked port in the RPLB protocol frame are different from the node numbering and the index numbering of the blocked port in the refreshed record information which is stored in the nodes themselves and corresponding to the receiving port, update the refreshed record information corresponding to the receiving port as the extracted node numbering and index numbering of the blocked port.

When the Ethernet ring network is stable, the node numbering of the RPL owner node and the index numbering of a blocked port are stored in refreshed record information corresponding to respective ports of each node on the ring. For example, the node numbering in the refreshed record information stored by Node S4 for Port 41 is 1 and the index numbering of the blocked port is 0; the node numbering in the refreshed record information stored for Port 42 is 1, and the index numbering of the blocked port is 0.

Figure 2:
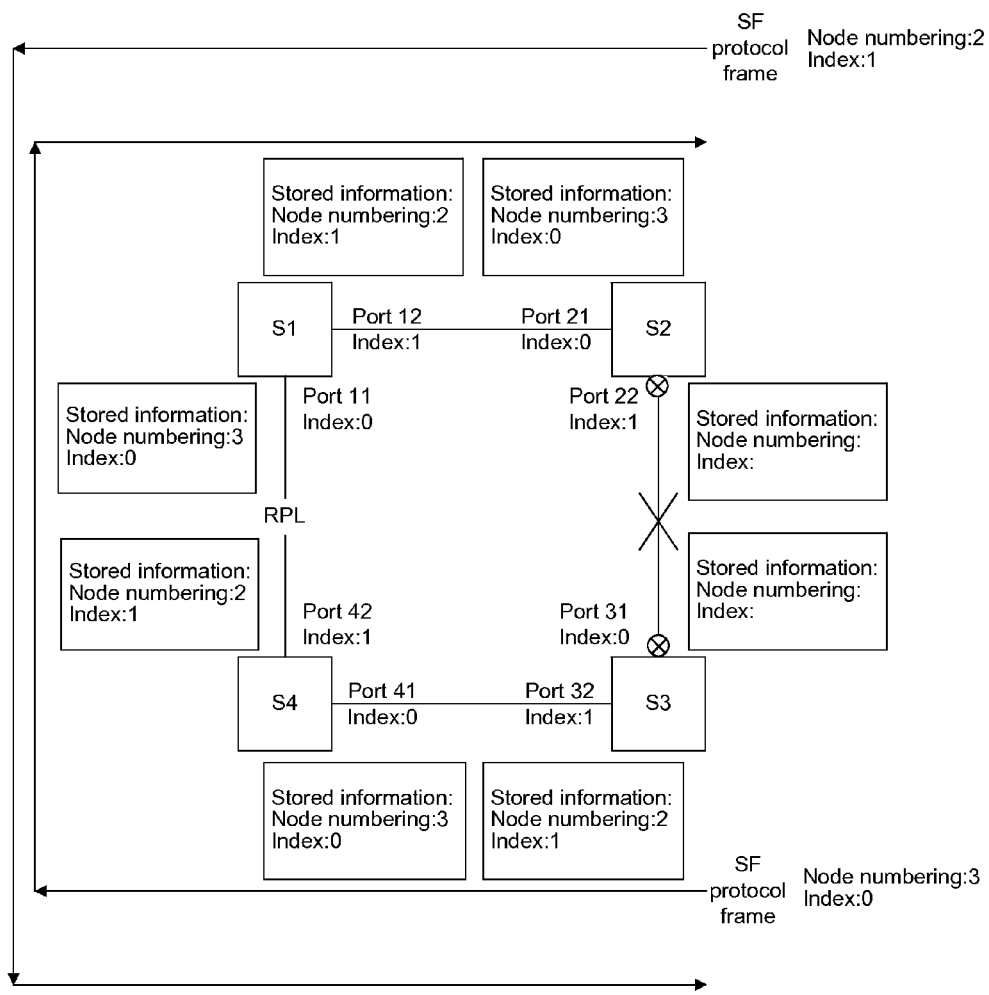
FIG. 2 is a schematic diagram illustrating an operation when a failure occurs in a link of an Ethernet ring network.

As shown in FIG. 2, FIG. 2 is a schematic diagram illustrating an operation when a failure occurs in a link of an Ethernet ring network. In FIG. 2, provided that Node S2 and Node S3 detect a failure occurs to a link, then Node S2 and Node S3 respectively block Port 22 and Port 31 connected to the failed link, and send a Signal Fail (SF) protocol frame to notify other nodes to perform protection switching. The SF protocol frame includes a node numbering of the sending node and an index numbering of a blocked port. Subsequently, after receiving the SF protocol frame, RPL owner Node S1 switched on the blocked Node 11 connected with the RPL.

After receiving the SF protocol frame, other nodes extract the node numbering and the index numbering of the blocked port in the SF protocol frame, and compares the node numbering and the index numbering of the blocked port in the SF protocol frame with a node numbering and an index numbering of a blocked port in stored refreshed record information which is corresponding to a receiving port, and if the node numbering and the index numbering of the blocked port in the SF protocol frame are different from the node numbering and the index numbering of the blocked port in the stored refreshed record information which is corresponding to the receiving port, update the refreshed record information corresponding to the receiving port as the extracted node numbering and index numbering of the blocked port and further need to refresh an address table.

For example, when Node S4 receives for the first time, at Port 41, the SF protocol frame sent by S3 after the link failure occurs, the node numbering included in the SF protocol frame is 3 and the index numbering of the blocked port is 0. Node S4 finds, through comparison, that the node numbering and the index numbering of the blocked port in the SF protocol frame are different from a node numbering and an index numbering of a blocked port in refreshed record information stored previously for Port 41, and therefore updates the refreshed record information corresponding to Port 41 as the node numbering of 3 and the index numbering of the blocked port of 0, and Node S4 further needs to refresh the address table.

Figure 3:
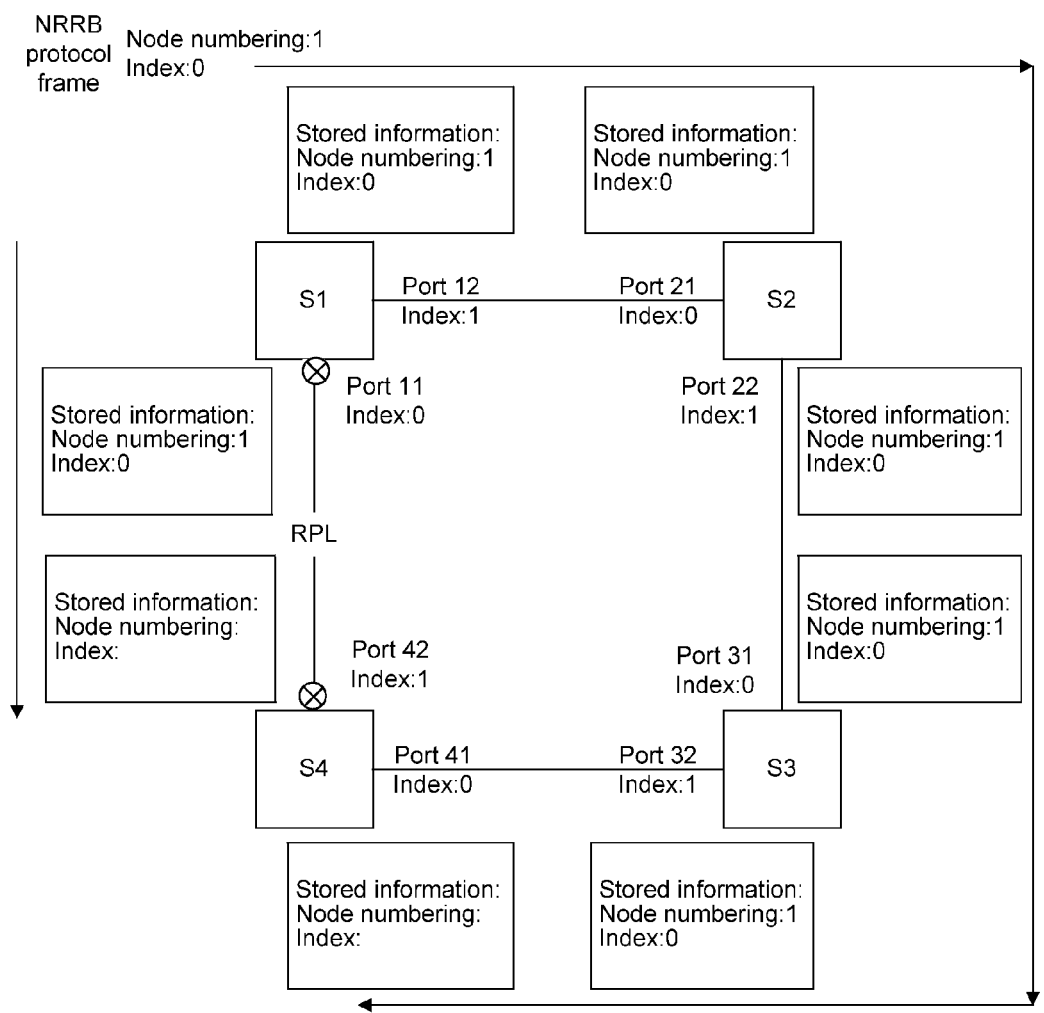
FIG. 3 is a schematic diagram illustrating a switchback operation upon recovery of a link of an Ethernet ring network from failure.

As shown in FIG. 3, FIG. 3 is a schematic diagram illustrating a switchback operation upon recovery of a link of an Ethernet ring network from failure. In FIG. 3, provided that Node S2 and Node S3 detect the link is recovered from the failure, then Node S2 and Node S3 send a no request protocol frame. After receiving the no request protocol frame, RPL owner Node S1 starts a Wait to Restore (WTR) timer. After the WTR timer expires, Node S1 blocks RPL port 11 and sends an RPLB protocol frame. After receiving the RPLB protocol frame, RPL neighbor Node S4 refreshes an address table, blocks RPL Port 42, and deletes refreshed record information corresponding respectively to Port 41 and Port 42. By doing so, Node S4 further needs to refresh the address table over again after Node S4 receives a subsequent RPLB protocol frame because there is no refreshed record information corresponding respectively to Port 41 and Port 42.

Figure 4:
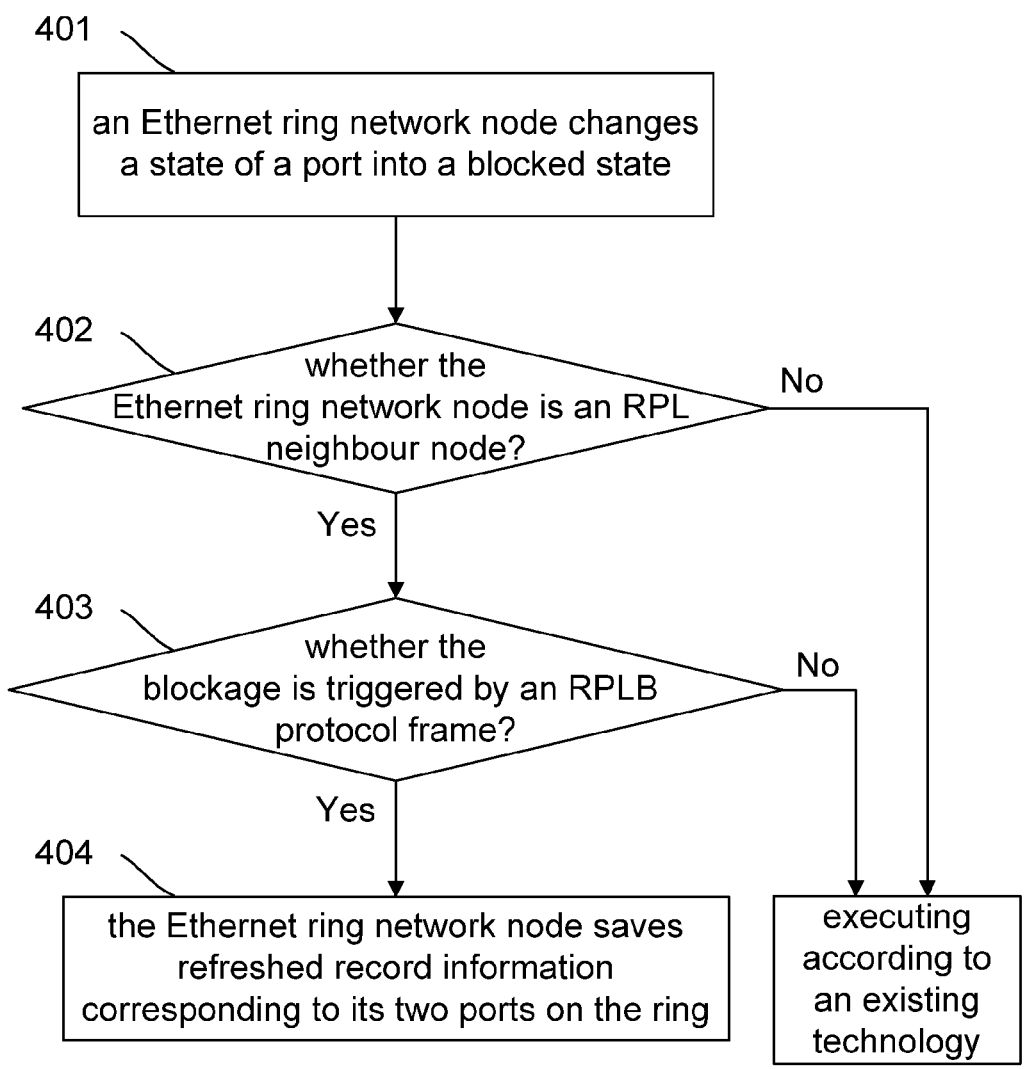
FIG. 4 is a flowchart of preventing repeated refreshing of an address table of an Ethernet ring network node according to an embodiment of the present disclosure.

During practical applications, operations as shown in FIG. 4 may be performed to avoid the above-mentioned case that S4 refreshes the address table over again. As shown in FIG. 4, FIG. 4 is a flowchart of preventing repeated refreshing of an address table of an Ethernet ring network node according to an embodiment of the present disclosure. The flow includes the following steps:

Step 401: an Ethernet ring network node changes a state of a port into a blocked state;

Step 402: it is determined whether the Ethernet ring network node is an RPL neighbor node; if so, Step 403 is executed, otherwise, a subsequent operation is executed according to an existing technology;

Step 403: it is determined whether the blockage is triggered by an RPLB protocol frame. If so, Step 404 is executed, otherwise, a subsequent operation is executed according to an existing technology; and Step 404: the Ethernet ring network node stores refreshed record information corresponding to its two ports on the ring instead of deleting the refreshed record information corresponding respectively to the two ports on the ring.

It can be seen from FIG. 4 that when a node in the Ethernet ring network changes the state of a port into a blocked state, the nodes needs to determine whether the node itself is an RPL neighbor node. If the node is an RPL neighbor node and the blockage operation is caused by the RPLB protocol frame received by the RPL neighbor node, then the node stores the refreshed record information corresponding respectively to its two ports on the ring instead of deleting the refreshed record information corresponding respectively to its two ports on the ring. In such a case, when the RPL neighbor node receives a subsequent RPLB protocol frame, the address table will not be refreshed over again, since a node numbering and an index numbering of a blocked port in the RPLB protocol frame have been stored on the RPL neighbor node.

Figure 5:
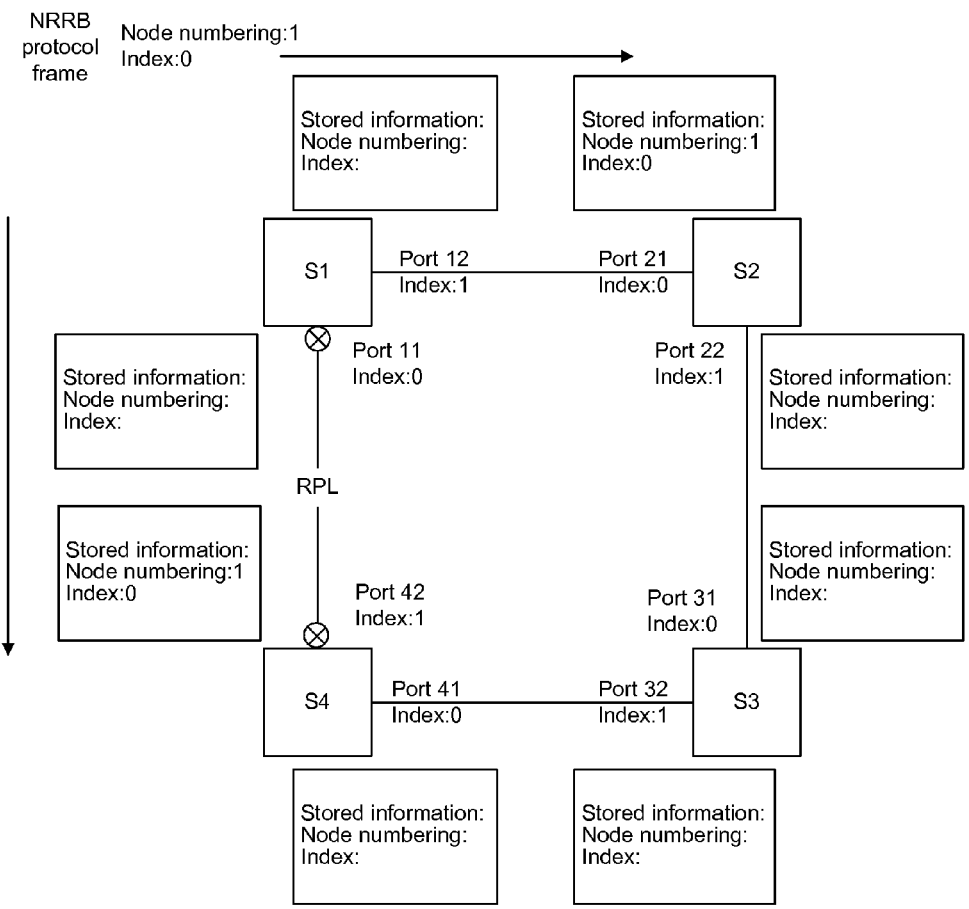
FIG. 5 is a schematic diagram illustrating a switchback operation upon recovery of a link of an Ethernet ring network from failure according to an embodiment of the present disclosure.

During specific applications, the case as shown in FIG. 5 can be realized by the flow as shown in FIG. 4. As shown in FIG. 5, FIG. 5 is a schematic diagram illustrating a switchback operation upon recovery of a link of an Ethernet ring network from failure according to an embodiment of the present disclosure. In FIG. 5, provided that Node S2 and Node S3 detect the link is recovered from the failure, then Node S2 and Node S3 send a no request protocol frame. After receiving the no request protocol frame, RPL owner Node S1 starts a WTR timer. After the WTR timer expires, Node S1 blocks RPL Port 11 and sends an RPLB protocol frame.

After receiving the RPLB protocol frame, RPL neighbor Node S4 refreshes an address table and blocks RPL Port 42. Subsequently, Node S4 determines that it is an RPL neighbor node via judgment and determines that the blockage action is caused by the received RPLB protocol frame. Therefore, refreshed record information corresponding respectively to Port 41 and Port 42 are retained instead of being deleted. After RPL neighbor Node S4 receives a subsequent RPLB protocol frame, since the node numbering and the index numbering of the blocked port in refreshed record information corresponding respectively to Port 41 and Port 42 are the same as a node numbering and an index numbering of a blocked port included in the RPLB protocol frame, RPL neighbor Node S4 will not refresh the address table over again so as to prevent repeated refreshing of the address table.

Figure 6:
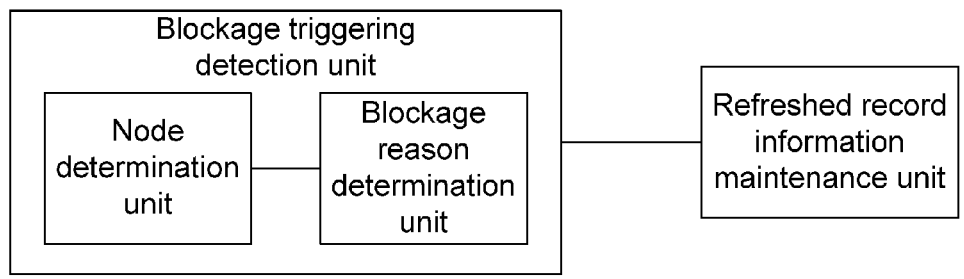
FIG. 6 is a diagram illustrating a device for preventing repeated refreshing of an address table of an Ethernet ring network node according to an embodiment of the present disclosure.

To realize the above-mentioned processes successfully, settings as shown in FIG. 6 may be performed. As shown in FIG. 6, FIG. 6 is a diagram illustrating a device for preventing repeated refreshing of an address table of an Ethernet ring network node according to an embodiment of the present disclosure. The device includes a blockage triggering detection unit and a refreshed record information maintenance unit connected to each other, wherein the blockage triggering detection unit includes a node determination unit and a blockage reason determination unit, wherein a connection relationship may exist between the node determination unit and the blockage reason determination unit.

During specific applications, the node determination unit is configured to determine, after a node to which the node determination unit belongs changes a state of a port of the node to a blocked state, whether the node to which the node determination unit belongs is an RPL neighbor node and notify the refreshed record information maintenance unit when the determination result is positive. The process of determining whether the node to which the node determination unit belongs is the RPL neighbor node may be realized by enquiring information such as a node attribute. The blockage reason determination unit is configured to determine whether the blockage operation is caused by a received RPLB protocol frame, and notify the refreshed record information maintenance unit when the determination result is positive. The process of determining whether the blockage operation is caused by the received RPLB protocol frame may be realized by parsing a content of a data structure of the received RPLB protocol frame etc. Of course, the node determination unit and the blockage reason determination unit can also notify the refreshed record information maintenance unit when their respective determination results are negative, as long as the refreshed record information maintenance unit can perform subsequent processing normally after receiving the notification.

It should be noted that, the node determination unit and the blockage reason determination unit can respectively notify the refreshed record information maintenance unit of their own determination results directly, or respectively notify their own determination results to the other party to trigger the other party to make subsequent determination. For example, the node determination unit determines that the node to which it belongs is an RPL neighbor node via judgment, and notifies the determination result to the blockage reason determination unit; the blockage reason determination unit is triggered by the notification from the node determination unit, and then determines that the blockage is triggered by an RPLB protocol frame via judgment, and subsequently sends its determination result and the determination result from the node determination unit to the refreshed record information maintenance unit.

After receiving the determination results from the node determination unit and the blockage reason determination unit, if the determination results show that the node to which the node determination unit and the blockage reason determination unit belong is an RPL neighbor node, and the blockage is triggered by the RPLB protocol frame, the refreshed record information maintenance unit determines that it needs to save refreshed record information corresponding to its two ports on the ring, therefore the refreshed record information maintenance executes the saving operation instead of executing an action of deleting the refreshed record information corresponding to the two ports on the ring.

To sum up, by applying either the method or the device of the present disclosure, the technology of preventing repeated refreshing of an address table of an Ethernet ring network node of the present disclosure can effectively solve the problem that an RPL neighbor node refreshes an address table repeatedly in the scenario of switchback of an Ethernet ring network, thereby reducing flow broadcast during protection switching of the Ethernet ring network and improving the switching efficiency.

The above are only preferred embodiments of the present disclosure and should not be used to limit the protection scope of the present disclosure. Any modifications, equivalent replacements, improvements and the like within the principle of the present disclosure shall fall within the protection scope of the present disclosure.

What is claimed is:

1. A method for preventing repeated refreshing of an address table of an Ethernet ring network node, comprising:
   determining by a blockage triggering detection unit of the Ethernet ring network node, after a state of a port of the Ethernet ring network node, except an Ring Protection Link (RPL) owner node, is changed to a blocked state during a switchback of the Ethernet ring network, whether the Ethernet ring network node to which the blockage triggering detection unit itself belongs is an RPL neighbor node;
   when the Ethernet ring network node is the RPL neighbor node, determining by the blockage triggering detection unit whether the blockage is triggered by an RPL Blocked (RPLB) protocol frame from the RPL owner node, and sending a determination result to a refreshed record information maintenance unit;
   when the Ethernet ring network node to which the blockage triggering detection unit itself belongs is the RPL neighbor node and the blockage is triggered by the RPL Blocked (RPLB) protocol frame from the RPL owner node, storing, by the refreshed record information maintenance unit of the Ethernet ring network node, the refreshed record information corresponding to two ports of the Ethernet ring network node to which the refreshed record information maintenance unit itself belongs on the ring; and
   wherein each of the blockage triggering detection unit and the refreshed record information maintenance unit are connected to each other and each comprising a computer processor and respective memory, the respective memory storing computer-readable instructions which when executed by the computer processor implement the functions of the said units.

2. The method according to claim 1, wherein the process of determining whether the Ethernet ring network node is the RPL neighbor node is realized via enquiring a node attribute of the Ethernet ring network node.

3. The method according to claim 1, wherein the process of determining whether the blockage is triggered by the RPLB protocol frame is realized via parsing a content of a received data structure.

4. The method according to claim 1, further comprising: executing a subsequent operation according to an existing technology if the Ethernet ring network node is determined not to be an RPL neighbor node.

5. The method according to claim 1, further comprising: executing a subsequent operation according to an existing technology if the blockage is not triggered by the RPLB protocol frame.

6. The method according to claim 1, wherein the refreshed record information comprises: a node numbering, and an index numbering of a blocked port.

7. A device for preventing repeated refreshing of an address table of an Ethernet ring network node, comprising a blockage triggering detection unit and a refreshed record information maintenance unit connected to each other, wherein the blockage triggering detection unit of the Ethernet ring network node is configured to determine, after a state of a port of the Ethernet ring network node, except an Ring Protection Link (RPL) owner node, is changed to a blocked state during a switchback of the Ethernet ring network, whether the Ethernet ring network node to which the blockage triggering detection unit itself belongs is a RPL neighbor node; and when the Ethernet ring network node is the RPL neighbor node, the blockage triggering detection unit is further configured to determine whether the blockage is triggered by an RPL Blocked (RPLB) protocol frame from the RPL owner node, and send a determination result to the refreshed record information maintenance unit;

the refreshed record information maintenance unit of the Ethernet ring network node is configured to save, when the Ethernet ring network node to which the blockage triggering detection unit itself belongs is the RPL neighbor node and the blockage is triggered by the RPLB protocol frame, refreshed record information corresponding to two ports of the Ethernet ring network node to which the refreshed record information maintenance unit itself belongs on the ring, each of the blockage triggering detection unit and the refreshed record information maintenance unit comprising a computer processor and respective memory, the respective memory storing computer-readable instructions which when executed by the computer processor implement the functions of the said units.

8. The device according to claim 7, wherein the blockage triggering detection unit comprises a node determination unit and a blockage reason determination unit, wherein the node determination unit is configured to determine whether the Ethernet ring network node to which the node determination unit itself belongs is an RPL neighbor node and generate a determination result which can be sent to the refreshed record information maintenance unit;

the blockage reason determination unit is configured to determine whether the blockage operation is caused by a received RPLB protocol frame and generate a determination result which can be sent to the refreshed record information maintenance unit.

9. The device according to claim 8, wherein the node determination unit and the blockage reason determination unit are configured to notify the refreshed record information maintenance unit of their respective generated determination results, or a connection relationship exists between the node determination unit and the blockage reason determination unit, and the node determination unit and the blockage reason determination unit are configured such that one of the node determination unit and the blockage reason determination unit notifies its determination result to another one of the node determination unit and the blockage reason determination unit, to trigger the another one to make subsequent determination.

10. The device according to claim 7, wherein the refreshed record information comprises: a node numbering, and an index numbering of a blocked port.

11. The method according to claim 2, further comprising: executing a subsequent operation according to an existing technology if the Ethernet ring network node is determined not to be an RPL neighbor node.

12. The method according to claim 3, further comprising: executing a subsequent operation according to an existing technology if the Ethernet ring network node is determined not to be an RPL neighbor node.

13. The method according to claim 2, further comprising: executing a subsequent operation according to an existing technology if the blockage is not triggered by the RPLB protocol frame.

14. The method according to claim 3, further comprising: executing a subsequent operation according to an existing technology if the blockage is not triggered by the RPLB protocol frame.

* * * * *